(12) United States Patent
Bi

(10) Patent No.: US 11,995,342 B2
(45) Date of Patent: May 28, 2024

(54) HOST INITIATED GARBAGE COLLECTION

(71) Applicant: Micron Technology, Inc., Boise, ID (US)

(72) Inventor: Yanhua Bi, Shanghai (CN)

(73) Assignee: Micron Technology, Inc., Boise, ID (US)

( * ) Notice: Subject to any disclaimer, the term of this patent is extended or adjusted under 35 U.S.C. 154(b) by 47 days.

(21) Appl. No.: 17/652,051

(22) Filed: Feb. 22, 2022

(65) Prior Publication Data

US 2023/0195362 A1 Jun. 22, 2023

Related U.S. Application Data

(60) Provisional application No. 63/265,913, filed on Dec. 22, 2021.

(51) Int. Cl.
*G06F 3/06* (2006.01)
*G06F 12/02* (2006.01)

(52) U.S. Cl.
CPC .......... *G06F 3/0655* (2013.01); *G06F 3/0604* (2013.01); *G06F 3/0679* (2013.01); *G06F 12/0246* (2013.01); *G06F 12/0253* (2013.01); *G06F 2212/7205* (2013.01)

(58) Field of Classification Search
CPC ..................... G06F 12/0246; G06F 2212/7205
See application file for complete search history.

(56) References Cited

U.S. PATENT DOCUMENTS

| 9,116,704 | B1* | 8/2015 | Nanda | G06F 1/3293 |
|---|---|---|---|---|
| 10,445,229 | B1* | 10/2019 | Kuzmin | G06F 12/10 |
| 2016/0357462 | A1* | 12/2016 | Nam | G06F 3/0613 |
| 2019/0138219 | A1* | 5/2019 | Gschwind | G06F 12/1036 |
| 2021/0294737 | A1* | 9/2021 | Wang | G06F 12/0822 |
| 2021/0397367 | A1* | 12/2021 | Kang | G06F 12/0246 |

\* cited by examiner

*Primary Examiner* — Jane W Benner
(74) *Attorney, Agent, or Firm* — Holland & Hart LLP

(57) ABSTRACT

Methods, systems, and devices for host initiated garbage collection are described. In some examples, a user accessible application or public interface of a host system may initiate a garbage collection procedure for a memory system using one or more vendor commands. For example, the host system and the memory system may support a first vendor command to check a fragmentation status or fragmentation parameter of the of the memory system. Additionally, the host system and the memory system may support a second vendor command to initiate a garbage collection procedure at the memory system, or to interrupt an ongoing garbage collection procedure. The host system and the memory system may also support a third vendor command to check the status of an initiated garbage collection procedure.

22 Claims, 6 Drawing Sheets

HOST INITIATED GARBAGE COLLECTION

CROSS REFERENCE

The present Application for Patent claims the benefit of U.S. Provisional Patent Application No. 63/265,913 by BI, entitled "HOST INITIATED GARBAGE COLLECTION," filed Dec. 22, 2021, assigned to the assignee hereof, and expressly incorporated by reference herein.

FIELD OF TECHNOLOGY

The following relates generally to one or more systems for memory and more specifically to host initiated garbage collection.

BACKGROUND

Memory devices are widely used to store information in various electronic devices such as computers, user devices, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

Figure 1:
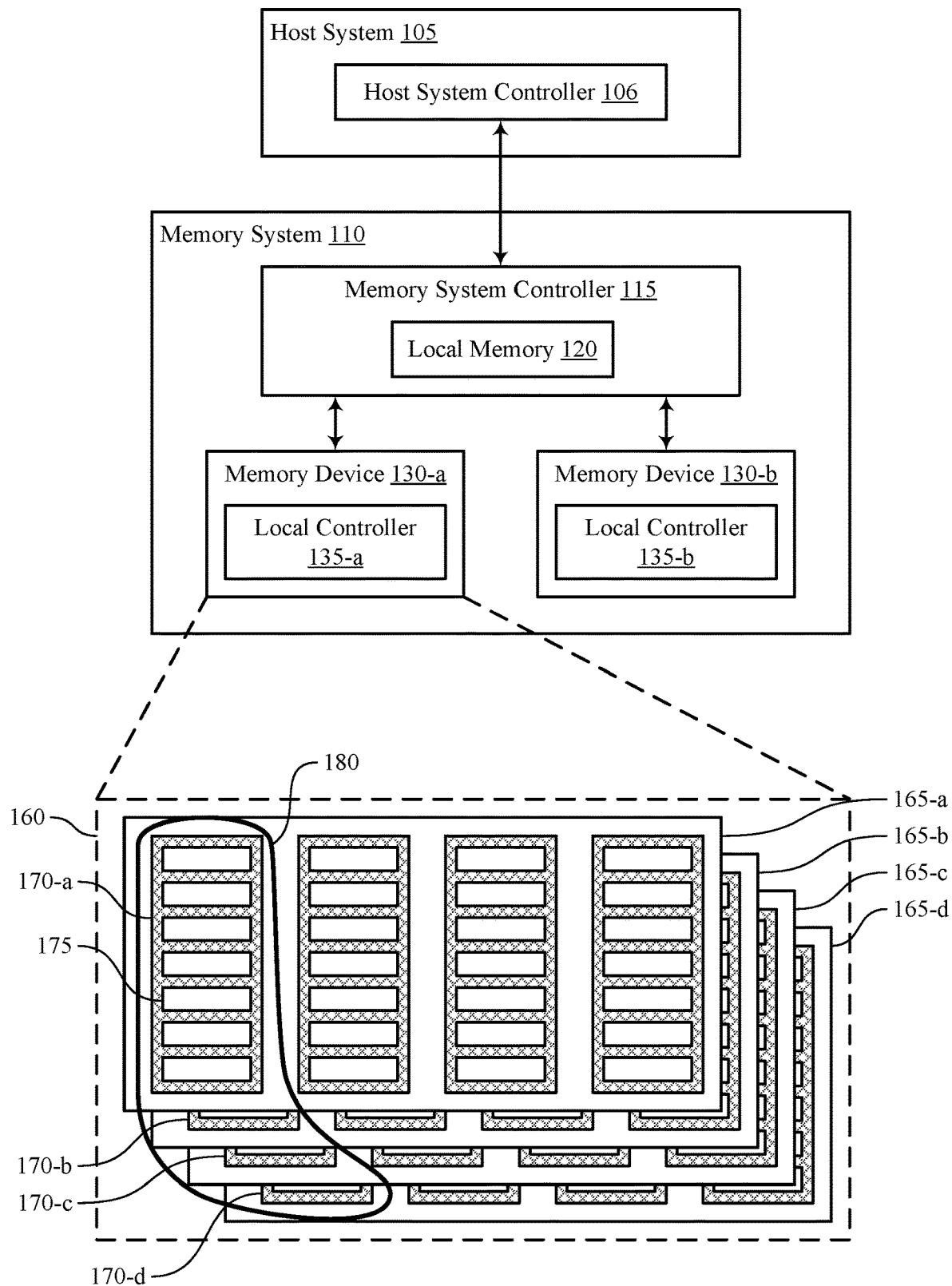
FIG. 1 illustrates an example of a system that supports host initiated garbage collection in accordance with examples as disclosed herein.

In some computing systems, a memory system may perform a memory management operation, such as a garbage collection procedure, to erase invalid data and free space to store additional information. In some memory systems, a garbage collection procedure may be initiated by a host system, for example as part of a host-initiated defragmentation (HID) procedure. As part of the HID procedure, the host system may use a kernel or other application to act as an intermediary between user-level applications, such as software, and data processing procedures. In some cases, to initiate the garbage collection procedure, the kernel may attempt to identify an idle period of operation (e.g., a period of time in which the memory system may not be performing access commands) to initiate a garbage collection procedure. However, the kernel may not be able to correctly determine whether the memory system is in an idle period. For example, the kernel may initiate a garbage collection procedure that may be interrupted by an access operation. Additionally or alternatively, a user may configure the host system to initiate the HID operation by modifying code of the kernel to issue a query command to set a flag or read attribute. However, modifying the code of the kernel to initiate the HID procedure may be complex or time consuming. Additionally, some memory systems may not support a user modified kernel. Accordingly, efficient techniques to allow a use to configure the HID procedure are desired.

As described herein, a garbage collection procedure (e.g., an HID procedure) may be initiated by a user accessible application or public interface of a host system using one or more vendor unique commands or one or more vendor commands. In some cases, a vendor command may be an example of a command which includes a vendor specific operation code. In some systems, some operation codes may be define operations used by host systems that access the memory system and some operation codes may be reserved for other uses, such as commands specific to special use, application or specific vendor. A memory system may be configured to decode or decrypt the vendor command using the operational code and perform a function or operation associated with the operational code. For example, the host system and the memory system may support a first vendor command to check a fragmentation status of the of the memory system. In some cases, the fragmentation status may include an indication of whether the memory system is to perform a garbage collection procedure. Additionally, the host system and the memory system may support a second vendor command to initiate a garbage collection procedure at the memory system, or to interrupt an ongoing garbage collection procedure. The host system and the memory system may also support a third vendor command to check the status of an initiated garbage collection procedure. By initiating a garbage collection procedure from a user accessible application or public interface of the host system, a user may have more direct control over an HID operation of the memory system, which may result in more efficient memory management and allocation of storage space within the memory system.

Features of the disclosure are initially described in the context of systems, devices, and circuits with reference to FIG. 1. Features of the disclosure are described in the context of a process flow with reference to FIG. 2. These and other features of the disclosure are further illustrated by and described in the context of an apparatus diagram and flowchart that relate to host initiated garbage collection with reference to FIGS. 3-6.

FIG. 1 illustrates an example of a system 100 that supports host initiated garbage collection in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may in some cases instead be performed by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programmed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may in some cases not be updated until the entire block 170 that includes the page 175 has been erased.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

The system 100 may include any quantity of non-transitory computer readable media that support host initiated garbage collection. For example, the host system 105, the memory system controller 115, or a memory device 130 (e.g., a local controller 135) may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

In some cases, a host system 105 may initiate or control a garbage collection procedure For example, the host system 105 and the memory system 110 may support a first vendor command to check a fragmentation status of the of the memory system 110. In some cases, the fragmentation status may include an indication of whether the memory system 110 is to perform a garbage collection procedure. Additionally, the host system 105 and the memory system 110 may support a second vendor command to initiate a garbage collection procedure at the memory system 110, or to interrupt an ongoing garbage collection procedure. The host system 105 and the memory system 110 may also support a third vendor command to check the status of an initiated garbage collection procedure.

Figure 2:
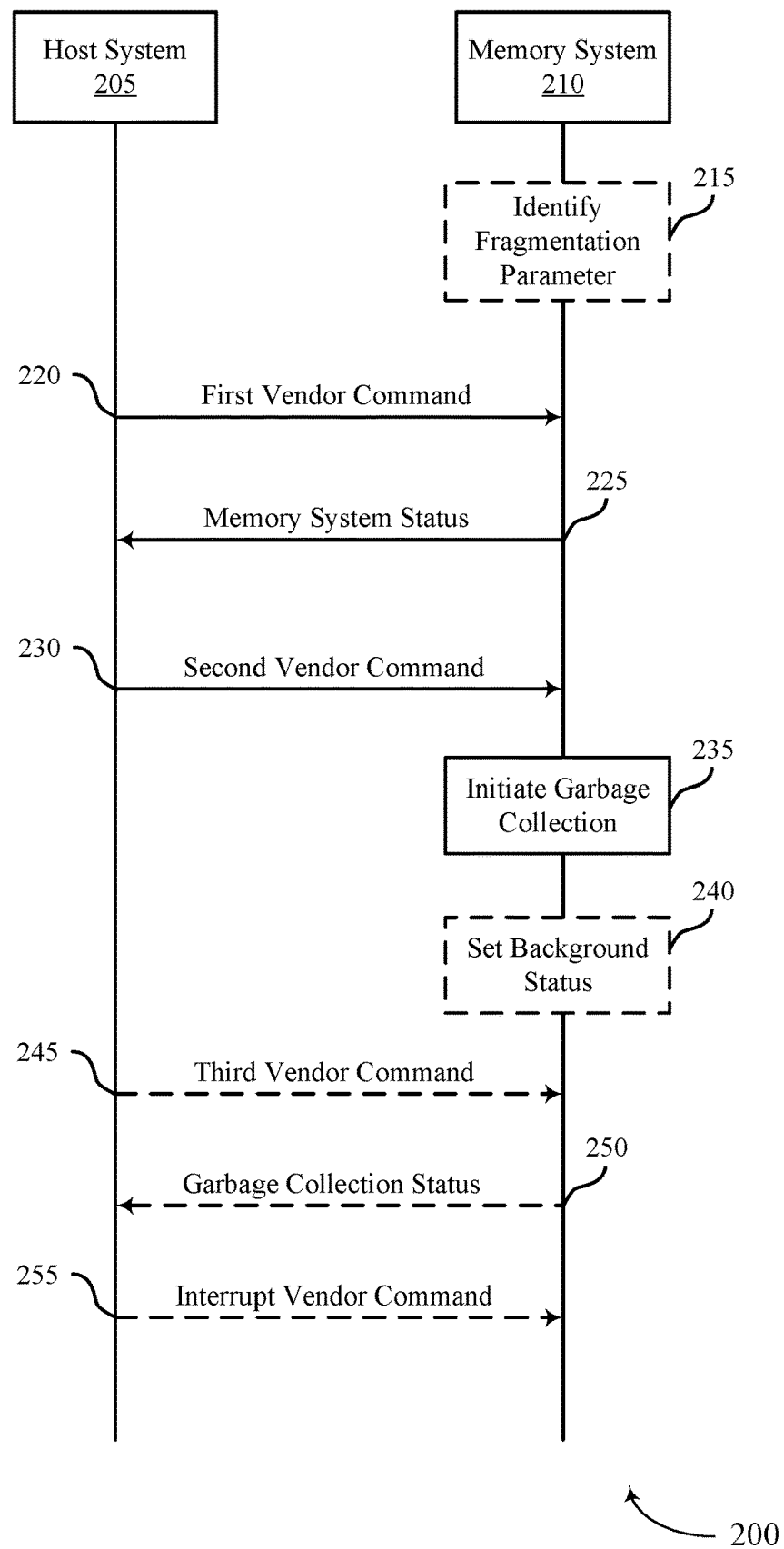
FIG. 2 illustrates an example of a process flow that supports host initiated garbage collection in accordance with examples as disclosed herein.

FIG. 2 illustrates an example of a process flow 200 that supports host initiated garbage collection in accordance with examples as disclosed herein. The process flow 200 may be implemented by a host system 205, for example using a host system controller, and by a memory system 210, for example using a memory system controller, which may be examples of the respective devices and controller described with reference to FIG. 1. In the following description of process flow 200, the operations may be performed in a different order than the order shown. For example, specific operations may also be left out of process flow 200, or other operations may be added to process flow 200.

In some examples, the memory system 210 may perform a memory management operation, such as a garbage collection procedure, to erase invalid data in a block of memory cells and release the block of memory cells as free. In some cases, the garbage collection procedure may be initiated by the host system 205, for example as part of an HID procedure. As part of the HID procedure, the host system 205 may use a kernel or other application to act as an intermediary between user-level applications, such as software, and lower level data processing procedures. In some cases, to initiate the garbage collection procedure, the kernel may attempt to identify an idle period of operation (e.g., a period of time in which the memory system may not be performing access commands) to initiate a garbage collection procedure. However, the kernel may not be able to correctly determine whether the memory system is in an idle period. For example, the kernel may initiate a garbage collection procedure that may be interrupted by an access operation. Additionally or alternatively, a user may configure the host system to initiate the HID operation by modifying code of the kernel to issue a query command to set a flag or read attribute. However, modifying the code of the kernel to initiate the HID procedure may be complex or time consuming. Additionally, some memory systems may not support a user modified kernel.

In some cases, a user accessible application or public interface of the host system 205 may initiate a garbage collection procedure using one or more vendor commands. In some cases, a vendor command may be an example of a command which may include a vendor specific operation code. In some systems, some operation codes may be define operations used by host systems that access the memory system and some operation codes may be reserved for other uses, such as commands specific to special use, application or specific vendor. The operation codes that are reserved for other uses may be defined at any time and implemented in the memory system. The memory system 210 may be configured to decode or decrypt the vendor command using the operational code and perform a function or operation associated with the operational code. For example, the host system 205 and the memory system 210 may support a first vendor command to check a fragmentation status or fragmentation parameter of the of the memory system 210. In some cases, the fragmentation parameter may include an indication of whether the memory system 210 is to perform a garbage collection procedure. Additionally, the host system 205 and the memory system 210 may support a second vendor command to initiate a garbage collection procedure at the memory system 210, or to interrupt an ongoing garbage collection procedure. The host system 205 and the memory system 210 may also support a third vendor command to check the status of an initiated garbage collection procedure. By initiating a garbage collection procedure from a user accessible application or public interface of the host system, a user of the host system 205 may have more direct control over an HID operation of the memory system 210, which may result in more efficient memory management and allocation of storage space within the memory system 210.

In some cases, the process flow 200 may include identifying the fragmentation parameter. For example, at 215, the memory system 210 may identify the fragmentation parameter. In some cases, the fragmentation parameter may be or include an indication of whether the memory system 210 is to perform a garbage collection procedure (e.g., a binary value such as a logical "1" or a logical "0"). Additionally or alternatively the fragmentation parameter may be or include an indication of a quantity of memory cells or blocks of memory cells which have been marked as invalid or otherwise include invalid memory cells. Additionally or alternatively the fragmentation parameter may be or include an indication of a quantity of memory cells or blocks of memory cells which have been marked as invalid or otherwise include invalid memory cells relative to a total quantity of memory cells or blocks available for use by the host system 205. Accordingly, identifying the fragmentation parameter may include calculating or otherwise determining the quantity of memory cells that have been marked as invalid, for example during a background procedure.

In some cases, the process flow 200 may include communicating a first vendor command to request a status of the memory system 210. For example, at 220, the host system 205 may transmit the first vendor command to the memory system 210. The first vendor command may include a write command to store the status of the memory device at a first buffer. For example, the write command may be a write buffer command and may include an indication of the address or location of the first buffer. In response to receiving the write command, the memory system 210 may transfer or store the status of the memory system 210 to the first buffer. In some case, the first vendor command may include a read command to read the first buffer, such as a read buffer command. The read buffer command may include an indication of the location or address of the first buffer, and may be transmitted after the transmitting the write command.

The status of the memory system 210 may be or may include the fragmentation parameter identified at 215. Additionally or alternatively, the status of the memory system 210 may be a value generated or calculated using the fragmentation parameter. For example, if the fragmentation parameter includes a quantity of memory cells that have been marked as invalid, the status of memory system 210 may be a binary value indicating whether the quantity of memory cells that have been marked as invalid exceeds a threshold. In some examples, the memory system 210 may identify or generate the status of the memory system 210 in response to receiving the first vendor command. Additionally or alternatively, the memory system 210 may identify or generate the status of the memory system 210 prior to receiving the first vendor command, for example as part of identifying the fragmentation parameter at 210. In some cases, the status of the memory system 210 may include two or more bits and may indicate one or more different levels of fragmentation experienced by the memory system. In such cases, the host system 205 may use the status to determine whether to perform a garbage collection procedure.

In some cases, the process flow 200 may include communicating the status of the memory system 210. For example, at 225, the memory system 210 may transmit the status of the memory system 210 to the host system 205. In some cases, the memory system 210 may transmit the status of the memory system 210 in response to the first vendor command received at 220, such as in response to the read command for the first buffer included in the first vendor command.

In some examples, the host system 205 may use the status of the memory system 210 to determine whether to initiate a garbage collection procedure for the memory system 210. For example, if the status of the memory system 210 indicates that the memory system 210 is to perform garbage collection, such as by including a binary value indicating whether the memory system 210 is to perform the garbage collection, the host system 205 may determine to initiate the garbage collection procedure for the memory system 210. Additionally or alternatively, the status of the memory system 210 may include a quantity of memory cells that have been marked as invalid. Accordingly, the host system 205 may determine whether the quantity of memory cells exceeds a threshold to determine whether to initiate the garbage collection procedure.

In some cases, the process flow 200 may include communicating a second vendor command to initiate the garbage collection procedure for the memory system 210. For example, at 230, the host system 205 may transmit the second vendor command to the memory system 210. The second vendor command may include write command to store an indication In some cases, the process flow 200 may include initiating the garbage collection procedure. For example, at 235, the memory system 210 may initiate the garbage collection procedure in response to receiving the second vendor command at 230. In some cases, the second vendor command may include a write command to store an indication to initiate the garbage collection procedure at a second buffer of the memory system 210. The second buffer may be separate from the first buffer, such as by having a different address or location, or the second buffer may be the same as the first buffer. The memory system 210 may identify the indication stored in second buffer, for example in response to receiving the second command. Additionally or alternatively, the memory system 210 may periodically check or read the value stored in the second buffer to determine whether to initiate the garbage collection procedure.

In some cases, the process flow 200 may include setting a background status. For example, at 240, the memory system 210 may set the background status to indicate whether the garbage collection procedure has been completed, or whether the garbage collection procedure is ongoing. In some cases, setting the background status may include setting or storing a value in a register or background operation status buffer of the memory system 210. The background status operation status buffer may include a size or length of storage capacity, such as a byte, and may store one or more values indicating the health status of the memory system 210. For example, the background operation status buffer may store a first value (e.g., a logical "0") indicating that the memory system 210 is not to perform a background operation, a second value (e.g., a logical "1") indicating that the memory system 210 is to perform a background operation, but that performing the background operation may not be useful to the health of the memory system 210, a third value (e.g., a logical "2") indicating that the memory system 210 is to perform a background operation and that the background operation may have a performance impact on the memory system 210, or a fourth value (e.g., a logical "3") indicating that performing a background operation may be as useful to the performance of the memory system 210.

In some cases, in response to receiving the second vendor command, the memory system 210 may set the value of the background operation status buffer to the third value or higher (e.g., to a value of 2 or higher) to indicate that the garbage collection procedure is ongoing. In some cases, the memory system 210 may delay entering a low power mode if the background status indicates that the garbage collection is ongoing. For example, while performing the garbage collection procedure, the memory system 210 may delay or refrain from issuing a command to enter the low power mode, such as a sleep command.

In some cases, the process flow 200 may include communicating a third vendor command to identify the status of the garbage collection procedure. For example, at 245, the host system 205 may transmit the third vendor command to the memory system 210. The third vendor command may include a write command to store the status of the garbage collection procedure at a third buffer. For example, the write command may be a write buffer command and may include an indication of the address or location of the third buffer. In response to receiving the write command, the memory system 210 may transfer or store the status of the garbage collection procedure to the third buffer. In some case, the third vendor command may include a read command to read the third buffer, such as a read buffer command. The read buffer command may include an indication of the location or address of the third buffer, and may be transmitted after the transmitting the write command.

In some cases, the process flow 200 may include communicating a garbage collection status of the memory system 210. For example, at 250, the memory system 210 may transmit the garbage collection status of the memory system 210 to the host system 205. In some cases, the garbage collection status of the memory system 210 may be or may include an indication of the background status set at 240. Additionally or alternatively, the status of the garbage collection procedure may be an indication of the progress of the garbage collection procedure. For example, the status of the garbage collection procedure may include an indication of a portion of the garbage collection procedure that has been complete, or may include an estimated remaining length of time until the garbage collection procedure will be complete.

In some cases, the process flow 200 may include communicating a fourth vendor command to interrupt the garbage collection procedure. For example, at 230, the host system 205 may transmit the fourth vendor command to the memory system 210. The fourth vendor command may include a write command to store an indication in a buffer of the memory system 210 to stop or interrupt the garbage collection procedure. In some cases, the indication may be stored in the second buffer (e.g., the buffer used to store the indication to initiate the garbage collection procedure). The memory system 210 may identify the indication stored in second buffer, for example in response to receiving the fourth command. Additionally or alternatively, the memory system 210 may periodically check or read the value stored in the second buffer to determine whether to interrupt the garbage collection procedure.

Aspects of the process flow 200 may be implemented by a controller, among other components. Additionally or alternatively, aspects of the process flow 200 may be implemented as instructions stored in memory (e.g., firmware stored in a memory coupled with the memory system 210 or with the host system 205). For example, the instructions, when executed by a controller (e.g., host system controller 106 or the memory system controller 115), may cause the controller to perform the operations of the process flow 200.

Figure 3:
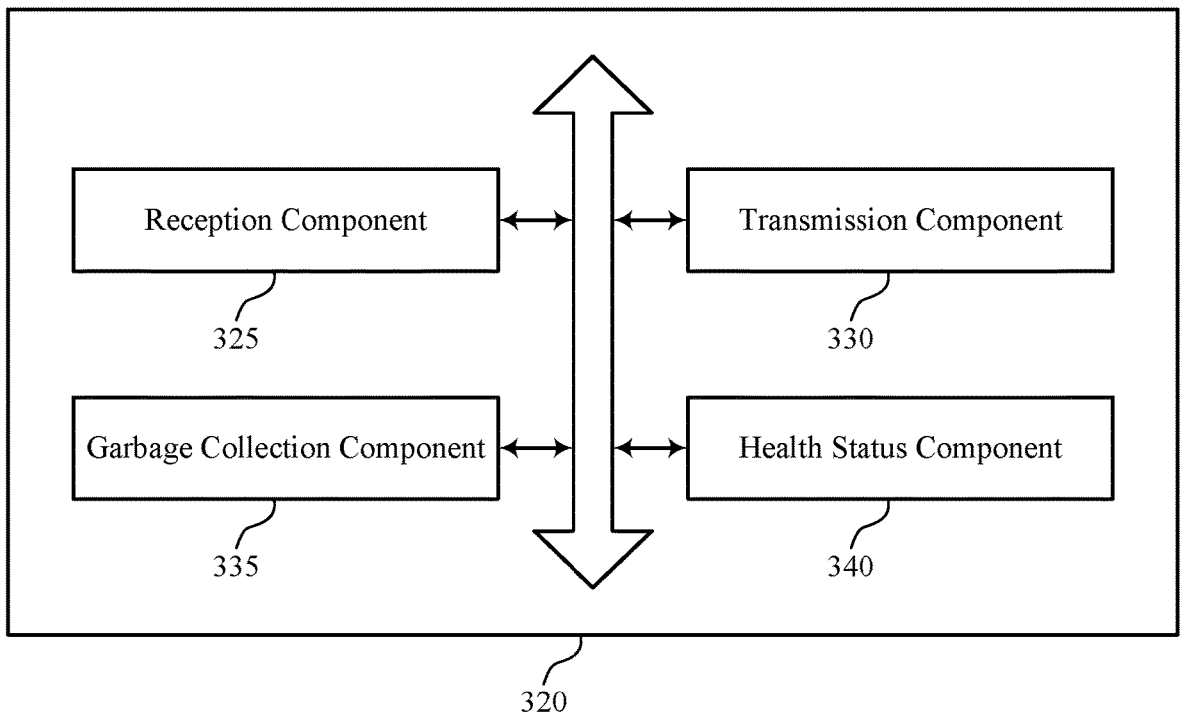
FIG. 3 shows a block diagram of a memory system that supports host initiated garbage collection in accordance with examples as disclosed herein.

FIG. 3 shows a block diagram 300 of a memory system 320 that supports host initiated garbage collection in accordance with examples as disclosed herein. The memory system 320 may be an example of aspects of a memory system as described with reference to FIGS. 1 through 2. The memory system 320, or various components thereof, may be an example of means for performing various aspects of host initiated garbage collection as described herein. For example, the memory system 320 may include a reception component 325, a transmission component 330, a garbage collection component 335, a health status component 340, or any combination thereof. Each of these components may communicate, directly or indirectly, with one another (e.g., via one or more buses).

The reception component 325 may be configured as or otherwise support a means for receiving, from a host system, a first vendor command requesting a status of a memory system, the status indicating a fragmentation parameter associated with addresses storing valid data relative to other addresses of the memory system. The transmission component 330 may be configured as or otherwise support a means for transmitting, to the host system, the status of the memory system based at least in part on receiving the first vendor command. In some examples, the reception component 325 may be configured as or otherwise support a means for receiving, from the host system, a second vendor command to initiate a garbage collection procedure based at least in part on transmitting the status. The garbage collection component 335 may be configured as or otherwise support a means for initiating the garbage collection procedure based at least in part on receiving the second vendor command.

In some examples, to support receiving the first vendor command, the reception component 325 may be configured as or otherwise support a means for receiving, from the host system, a write command to store the status of the memory system at a first buffer. In some examples, to support receiving the first vendor command, the reception component 325 may be configured as or otherwise support a means for receiving, from the host system, a read command for the first buffer, where transmitting the status of the memory system is further based at least in part on receiving the read command.

In some examples, to support receiving the second vendor command, the reception component 325 may be configured as or otherwise support a means for receiving, from the host system, a write command to store an indication to initiate the garbage collection procedure at a second buffer, where initiating the garbage collection procedure is based at least in part on identifying the indication.

In some examples, the reception component 325 may be configured as or otherwise support a means for receiving, from the host system, a third vendor command to identify a status of the garbage collection procedure stored in a second buffer, the status of the garbage collection procedure based at least in part on determining whether the garbage collection procedure has been completed. In some examples, the transmission component 330 may be configured as or otherwise support a means for transmitting, to the host system, the status of the garbage collection procedure based at least in part on receiving the third vendor command.

In some examples, to support receiving the third vendor command, the reception component 325 may be configured as or otherwise support a means for receiving, from the host system, a write command to store the status of the garbage collection procedure at the second buffer. In some examples, to support receiving the third vendor command, the reception component 325 may be configured as or otherwise support a means for receiving, from the host system, a read command for the second buffer, where transmitting the status of the garbage collection procedure is further based at least in part on receiving the read command.

In some examples, the reception component 325 may be configured as or otherwise support a means for receiving, from the host system, a third vendor command to interrupt the garbage collection procedure based at least in part on receiving the first vendor command. In some examples, the garbage collection component 335 may be configured as or otherwise support a means for interrupting the garbage collection procedure based at least in part on receiving the third vendor command.

In some examples, to support receiving the third vendor command, the reception component 325 may be configured as or otherwise support a means for receiving, from the host system, a write command to store an indication to interrupt the garbage collection procedure at a second buffer, where interrupting the garbage collection procedure is based at least in part on identifying the indication.

In some examples, the health status component 340 may be configured as or otherwise support a means for identifying the fragmentation parameter, where transmitting the status of the memory system is based at least in part on identifying the fragmentation parameter.

In some examples, to support identifying the fragmentation parameter, the health status component 340 may be configured as or otherwise support a means for determining, by the memory system, whether to perform the garbage collection procedure.

In some examples, the health status component 340 may be configured as or otherwise support a means for storing an indication that the garbage collection procedure is ongoing based at least in part on initiating the garbage collection procedure.

In some examples, the health status component 340 may be configured as or otherwise support a means for delaying entering a low power mode of the memory system based at least in part on the indication that the garbage collection procedure is ongoing.

In some examples, the second vendor command to initiate the garbage collection procedure is associated with an HID operation. In some examples, the HID operation includes the garbage collection procedure.

In some examples, the health status component 340 may be configured as or otherwise support a means for setting, at the memory device, an indication that the garbage collection procedure is being performed based at least in part on initiating the garbage collection procedure.

Figure 4:
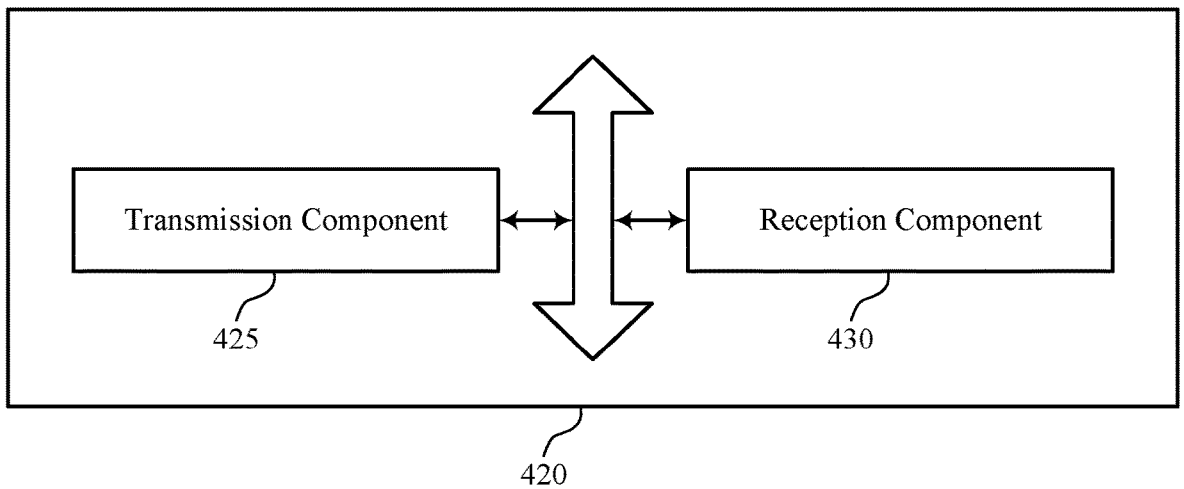
FIG. 4 shows a block diagram of a host system that supports host initiated garbage collection in accordance with examples as disclosed herein.

FIG. 4 shows a block diagram 400 of a host system 420 that supports host initiated garbage collection in accordance with examples as disclosed herein. The host system 420 may be an example of aspects of a host system as described with reference to FIGS. 1 through 2. The host system 420, or various components thereof, may be an example of means for performing various aspects of host initiated garbage collection as described herein. For example, the host system 420 may include a transmission component 425 a reception component 430, or any combination thereof. Each of these components may communicate, directly or indirectly, with one another (e.g., via one or more buses).

The transmission component 425 may be configured as or otherwise support a means for transmitting, to a memory system, a first vendor command requesting a status of the memory system, the status indicating a fragmentation parameter associated with addresses storing valid data relative to other addresses of the memory system. The reception component 430 may be configured as or otherwise support a means for receiving, from the memory system, the status of the memory system based at least in part on transmitting the first vendor command. In some examples, the transmission component 425 may be configured as or otherwise support a means for transmitting, to the memory system, a second vendor command to initiate a garbage collection procedure based at least in part on the status.

In some examples, to support transmitting the first vendor command, the transmission component 425 may be configured as or otherwise support a means for transmitting, to the memory system, a write command to store the status of the memory system at a first buffer. In some examples, to support transmitting the first vendor command, the transmission component 425 may be configured as or otherwise support a means for transmitting, to the memory system, a read command for the first buffer, where transmitting the status of the memory system is further based at least in part on receiving the read command.

In some examples, to support transmitting the second vendor command, the transmission component 425 may be configured as or otherwise support a means for transmitting, to the memory system, a write command to store an indication to initiate the garbage collection procedure at a second buffer, where initiating the garbage collection procedure is based at least in part on identifying the indication.

In some examples, the transmission component 425 may be configured as or otherwise support a means for transmitting, to the memory system, a third vendor command to identify a status of the garbage collection procedure stored in a second buffer, the status of the garbage collection procedure based at least in part on determining whether the garbage collection procedure has been completed. In some examples, the reception component 430 may be configured as or otherwise support a means for receiving, from the memory system, the status of the garbage collection procedure based at least in part on transmitting the third vendor command.

In some examples, to support transmitting the third vendor command, the transmission component 425 may be configured as or otherwise support a means for transmitting, to the memory system, a write command to store the status of the garbage collection procedure at the second buffer. In some examples, to support transmitting the third vendor command, the transmission component 425 may be configured as or otherwise support a means for transmitting, to the memory system, a read command for the second buffer, where receiving the status of the garbage collection procedure is further based at least in part on receiving the read command.

In some examples, the transmission component 425 may be configured as or otherwise support a means for transmitting, to the memory system, a third vendor command to interrupt the garbage collection procedure based at least in part on transmitting the first vendor command.

In some examples, to support transmitting the third vendor command, the transmission component 425 may be configured as or otherwise support a means for transmitting, to the memory system, a write command to store an indication to interrupt the garbage collection procedure at a second buffer, where interrupting the garbage collection procedure is based at least in part on identifying the indication.

In some examples, the second vendor command to initiate the garbage collection procedure is associated with an HID operation. In some examples, the HID operation includes the garbage collection procedure.

Figure 5:
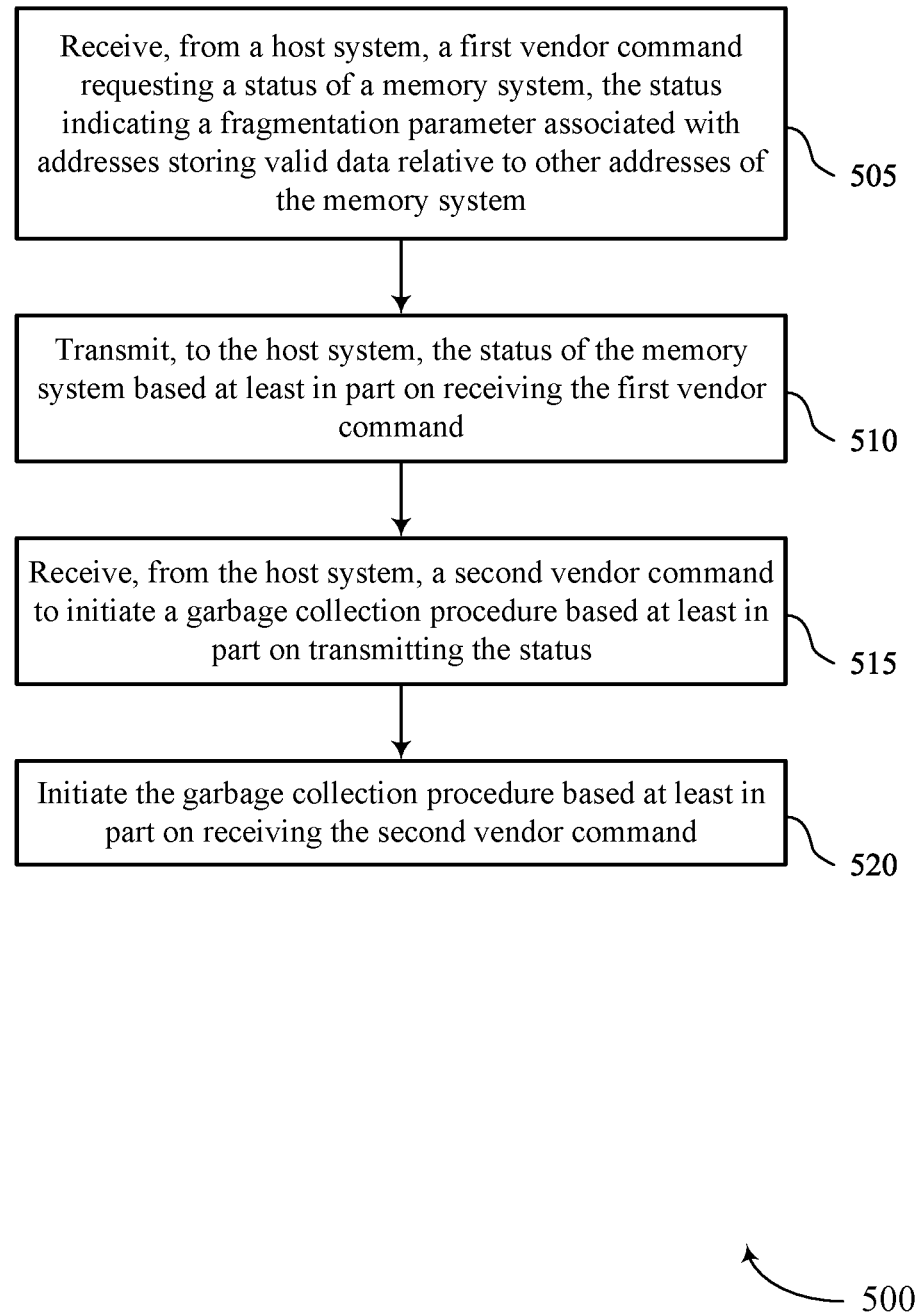
FIGS. 5 and 6 show flowcharts illustrating a method or methods that support host initiated garbage collection in accordance with examples as disclosed herein.

FIG. 5 shows a flowchart illustrating a method 500 that supports host initiated garbage collection in accordance with examples as disclosed herein. The operations of method 500 may be implemented by a memory system or its components as described herein. For example, the operations of method 500 may be performed by a memory system as described with reference to FIGS. 1 through 3. In some examples, a memory system may execute a set of instructions to control the functional elements of the device to perform the described functions. Additionally or alternatively, the memory system may perform aspects of the described functions using special-purpose hardware.

At 505, the method may include receiving, from a host system, a first vendor command requesting a status of a memory system, the status indicating a fragmentation parameter associated with addresses storing valid data relative to other addresses of the memory system. The operations of 505 may be performed in accordance with examples as disclosed herein. In some examples, aspects of the operations of 505 may be performed by a reception component 325 as described with reference to FIG. 3.

At 510, the method may include transmitting, to the host system, the status of the memory system based at least in part on receiving the first vendor command. The operations of 510 may be performed in accordance with examples as disclosed herein. In some examples, aspects of the operations of 510 may be performed by a transmission component 330 as described with reference to FIG. 3.

At 515, the method may include receiving, from the host system, a second vendor command to initiate a garbage collection procedure based at least in part on transmitting the status. The operations of 515 may be performed in accordance with examples as disclosed herein. In some examples, aspects of the operations of 515 may be performed by a reception component 325 as described with reference to FIG. 3.

At 520, the method may include initiating the garbage collection procedure based at least in part on receiving the second vendor command. The operations of 520 may be performed in accordance with examples as disclosed herein. In some examples, aspects of the operations of 520 may be performed by a garbage collection component 335 as described with reference to FIG. 3.

In some examples, an apparatus as described herein may perform a method or methods, such as the method 500. The apparatus may include, features, circuitry, logic, means, or instructions (e.g., a non-transitory computer-readable medium storing instructions executable by a processor), or any combination thereof for performing the following aspects of the present disclosure:

Aspect 1: The apparatus, including features, circuitry, logic, means, or instructions, or any combination thereof for receiving, from a host system, a first vendor command requesting a status of a memory system, the status indicating a fragmentation parameter associated with addresses storing valid data relative to other addresses of the memory system; transmitting, to the host system, the status of the memory system based at least in part on receiving the first vendor command; receiving, from the host system, a second vendor command to initiate a garbage collection procedure based at least in part on transmitting the status; and initiating the garbage collection procedure based at least in part on receiving the second vendor command.

Aspect 2: The apparatus of aspect 1 where receiving the first vendor command, further includes operations, features, circuitry, logic, means, or instructions, or any combination thereof for receiving, from the host system, a write command to store the status of the memory system at a first buffer and receiving, from the host system, a read command for the first buffer, where transmitting the status of the memory system is further based at least in part on receiving the read command.

Aspect 3: The apparatus of any of aspects 1 through 2 where receiving the second vendor command, further includes operations, features, circuitry, logic, means, or instructions, or any combination thereof for receiving, from the host system, a write command to store an indication to initiate the garbage collection procedure at a second buffer, where initiating the garbage collection procedure is based at least in part on identifying the indication.

Aspect 4: The apparatus of any of aspects 1 through 3, further including operations, features, circuitry, logic, means, or instructions, or any combination thereof for receiving, from the host system, a third vendor command to identify a status of the garbage collection procedure stored in a second buffer, the status of the garbage collection procedure based at least in part on determining whether the garbage collection procedure has been completed and transmitting, to the host system, the status of the garbage collection procedure based at least in part on receiving the third vendor command.

Aspect 5: The apparatus of aspect 4 where receiving the third vendor command, further includes operations, features, circuitry, logic, means, or instructions, or any combination thereof for receiving, from the host system, a write command to store the status of the garbage collection procedure at the second buffer and receiving, from the host system, a read command for the second buffer, where transmitting the status of the garbage collection procedure is further based at least in part on receiving the read command.

Aspect 6: The apparatus of any of aspects 1 through 5, further including operations, features, circuitry, logic, means, or instructions, or any combination thereof for receiving, from the host system, a third vendor command to interrupt the garbage collection procedure based at least in part on receiving the first vendor command and interrupting the garbage collection procedure based at least in part on receiving the third vendor command.

Aspect 7: The apparatus of aspect 6 where receiving the third vendor command, further includes operations, features, circuitry, logic, means, or instructions, or any combination thereof for receiving, from the host system, a write command to store an indication to interrupt the garbage collection procedure at a second buffer, where interrupting the garbage collection procedure is based at least in part on identifying the indication.

Aspect 8: The apparatus of any of aspects 1 through 7, further including operations, features, circuitry, logic, means, or instructions, or any combination thereof for identifying the fragmentation parameter, where transmitting the status of the memory system is based at least in part on identifying the fragmentation parameter.

Aspect 9: The apparatus of aspect 8 where identifying the fragmentation parameter, further includes operations, features, circuitry, logic, means, or instructions, or any combination thereof for determining, by the memory system, whether to perform the garbage collection procedure.

Aspect 10: The apparatus of any of aspects 1 through 9, further including operations, features, circuitry, logic, means, or instructions, or any combination thereof for storing an indication that the garbage collection procedure is ongoing based at least in part on initiating the garbage collection procedure.

Aspect 11: The apparatus of aspect 10, further including operations, features, circuitry, logic, means, or instructions, or any combination thereof for delaying entering a low power mode of the memory system based at least in part on the indication that the garbage collection procedure is ongoing.

Aspect 12: The apparatus of any of aspects 1 through 11, further including operations, features, circuitry, logic, means, or instructions, or any combination thereof for the second vendor command to initiate the garbage collection procedure is associated with an HID operation and the HID operation includes the garbage collection procedure.

Aspect 13: The apparatus of any of aspects 1 through 12, further including operations, features, circuitry, logic, means, or instructions, or any combination thereof for setting, at the memory device, an indication that the garbage collection procedure is being performed based at least in part on initiating the garbage collection procedure.

Figure 6:
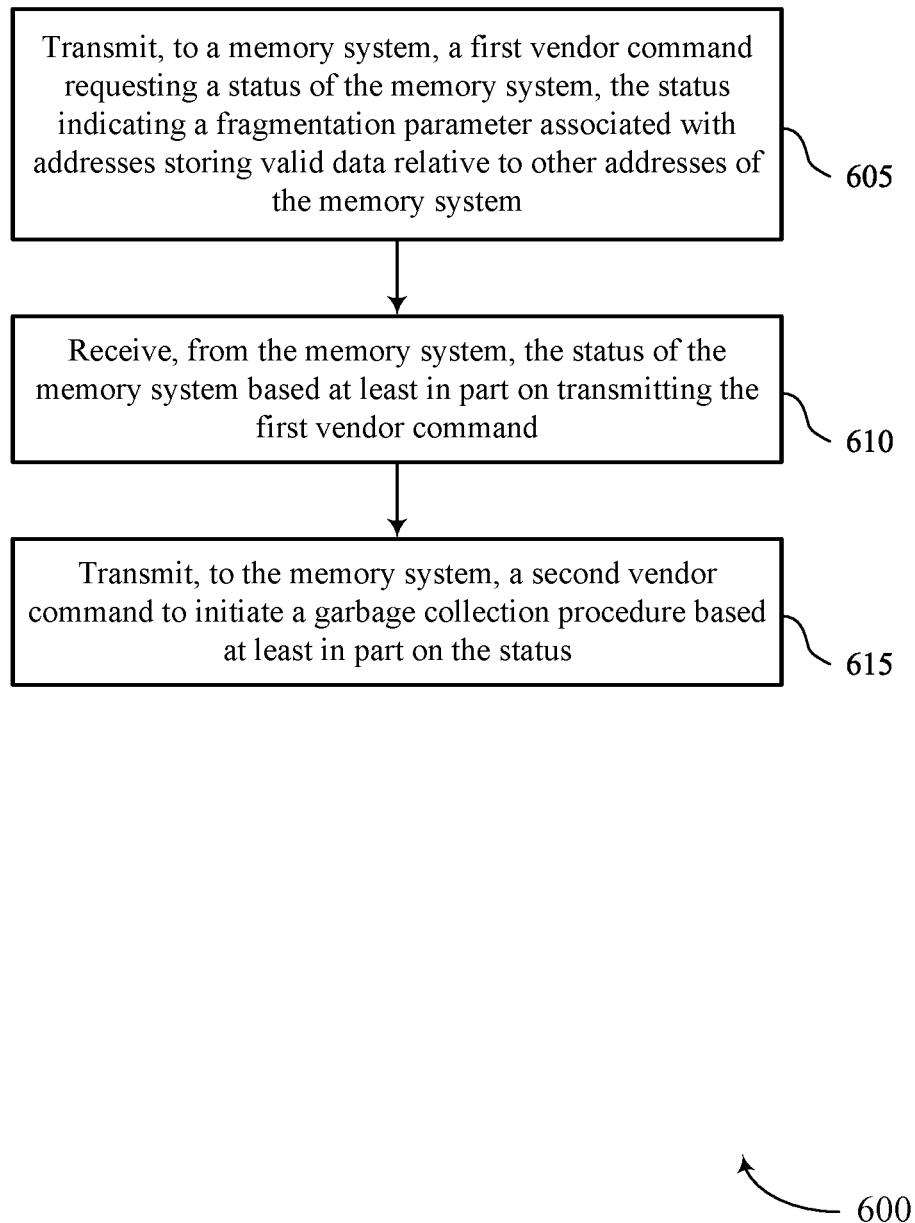

FIG. 6 shows a flowchart illustrating a method 600 that supports host initiated garbage collection in accordance with examples as disclosed herein. The operations of method 600 may be implemented by a host system or its components as described herein. For example, the operations of method 600 may be performed by a host system as described with reference to FIGS. 1 through 2 and 4. In some examples, a host system may execute a set of instructions to control the functional elements of the device to perform the described functions. Additionally or alternatively, the host system may perform aspects of the described functions using special-purpose hardware.

At 605, the method may include transmitting, to a memory system, a first vendor command requesting a status of the memory system, the status indicating a fragmentation parameter associated with addresses storing valid data relative to other addresses of the memory system. The operations of 605 may be performed in accordance with examples as disclosed herein. In some examples, aspects of the operations of 605 may be performed by a transmission component 425 as described with reference to FIG. 4.

At 610, the method may include receiving, from the memory system, the status of the memory system based at least in part on transmitting the first vendor command. The operations of 610 may be performed in accordance with examples as disclosed herein. In some examples, aspects of the operations of 610 may be performed by a reception component 430 as described with reference to FIG. 4.

At 615, the method may include transmitting, to the memory system, a second vendor command to initiate a garbage collection procedure based at least in part on the status. The operations of 615 may be performed in accordance with examples as disclosed herein. In some examples, aspects of the operations of 615 may be performed by a transmission component 425 as described with reference to FIG. 4.

In some examples, an apparatus as described herein may perform a method or methods, such as the method 600. The apparatus may include, features, circuitry, logic, means, or instructions (e.g., a non-transitory computer-readable medium storing instructions executable by a processor), or any combination thereof for performing the following aspects of the present disclosure:

Aspect 14: The apparatus, including features, circuitry, logic, means, or instructions, or any combination thereof for transmitting, to a memory system, a first vendor command requesting a status of the memory system, the status indicating a fragmentation parameter associated with addresses storing valid data relative to other addresses of the memory system; receiving, from the memory system, the status of the memory system based at least in part on transmitting the first vendor command; and transmitting, to the memory system, a second vendor command to initiate a garbage collection procedure based at least in part on the status.

Aspect 15: The apparatus of aspect 14 where transmitting the first vendor command, further includes operations, features, circuitry, logic, means, or instructions, or any combination thereof for transmitting, to the memory system, a write command to store the status of the memory system at a first buffer and transmitting, to the memory system, a read command for the first buffer, where transmitting the status of the memory system is further based at least in part on receiving the read command.

Aspect 16: The apparatus of any of aspects 14 through 15 where transmitting the second vendor command, further includes operations, features, circuitry, logic, means, or instructions, or any combination thereof for transmitting, to the memory system, a write command to store an indication to initiate the garbage collection procedure at a second buffer, where initiating the garbage collection procedure is based at least in part on identifying the indication.

Aspect 17: The apparatus of any of aspects 14 through 16, further including operations, features, circuitry, logic, means, or instructions, or any combination thereof for transmitting, to the memory system, a third vendor command to identify a status of the garbage collection procedure stored in a second buffer, the status of the garbage collection procedure based at least in part on determining whether the garbage collection procedure has been completed and receiving, from the memory system, the status of the garbage collection procedure based at least in part on transmitting the third vendor command.

Aspect 18: The apparatus of aspect 17 where transmitting the third vendor command, further includes operations, features, circuitry, logic, means, or instructions, or any combination thereof for transmitting, to the memory system, a write command to store the status of the garbage collection procedure at the second buffer and transmitting, to the memory system, a read command for the second buffer, where receiving the status of the garbage collection procedure is further based at least in part on receiving the read command.

Aspect 19: The apparatus of any of aspects 14 through 18, further including operations, features, circuitry, logic, means, or instructions, or any combination thereof for transmitting, to the memory system, a third vendor command to interrupt the garbage collection procedure based at least in part on transmitting the first vendor command.

Aspect 20: The apparatus of aspect 19 where transmitting the third vendor command, further includes operations, features, circuitry, logic, means, or instructions, or any combination thereof for transmitting, to the memory system, a write command to store an indication to interrupt the garbage collection procedure at a second buffer, where interrupting the garbage collection procedure is based at least in part on identifying the indication.

Aspect 21: The apparatus of any of aspects 14 through 20, further including operations, features, circuitry, logic, means, or instructions, or any combination thereof for the second vendor command to initiate the garbage collection procedure is associated with an HID operation and the HID operation includes the garbage collection procedure.

It should be noted that the methods described above describe possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
a controller associated with a memory device, wherein the controller is configured to cause the apparatus to:
receive, from a host system, a first vendor command requesting a status of a memory system, the status indicating a fragmentation parameter associated with addresses storing valid data relative to other addresses of the memory system, wherein the first vendor command comprises a write buffer command to store the status at a first buffer and an indication of an address of the first buffer, and wherein the first vendor command further comprises a read buffer command to read the status at a first buffer and an indication of the address of the first buffer;
transmit, to the host system, the status of the memory system based at least in part on receiving the first vendor command;
receive, from the host system, a second vendor command to initiate a garbage collection procedure based at least in part on transmitting the status;
initiate the garbage collection procedure based at least in part on receiving the second vendor command;
receive, from the host system, a third vendor command to identify a status of the garbage collection procedure stored in a second buffer, wherein the status comprises an indication of a portion of the garbage collection procedure that has been completed; and
transmit, to the host system, the status of the garbage collection procedure based at least in part on receiving the third vendor command.

2. The apparatus of claim 1, wherein receiving the first vendor command is configured to cause the apparatus to:
receive, from the host system, a write command to store the status of the memory system at the first buffer; and
receive, from the host system, a read command for the first buffer, wherein transmitting the status of the memory system is further based at least in part on receiving the read command.

3. The apparatus of claim 1, wherein receiving the second vendor command is configured to cause the apparatus to:
receive, from the host system, a write command to store an indication to initiate the garbage collection procedure at a second buffer, wherein initiating the garbage collection procedure is based at least in part on identifying the indication.

4. The apparatus of claim 1, wherein receiving the third vendor command is configured to cause the apparatus to:
receive, from the host system, a write command to store the status of the garbage collection procedure at the second buffer; and
receive, from the host system, a read command for the second buffer, wherein transmitting the status of the garbage collection procedure is further based at least in part on receiving the read command.

5. The apparatus of claim 1, wherein the controller is further configured to cause the apparatus to:
receive, from the host system, a fourth vendor command to interrupt the garbage collection procedure based at least in part on receiving the first vendor command; and
interrupt the garbage collection procedure based at least in part on receiving the fourth vendor command.

6. The apparatus of claim 5, wherein receiving the fourth vendor command is configured to cause the apparatus to:
receive, from the host system, a write command to store an indication to interrupt the garbage collection procedure at a second buffer, wherein interrupting the garbage collection procedure is based at least in part on identifying the indication.

7. The apparatus of claim 1, wherein the controller is further configured to cause the apparatus to:
identify the fragmentation parameter, wherein transmitting the status of the memory system is based at least in part on identifying the fragmentation parameter.

8. The apparatus of claim 7, wherein identifying the fragmentation parameter is further configured to cause the apparatus to:
determine, by the memory system, whether to perform the garbage collection procedure.

9. The apparatus of claim 1, wherein the controller is further configured to cause the apparatus to:
store an indication that the garbage collection procedure is ongoing based at least in part on initiating the garbage collection procedure.

10. The apparatus of claim 9, wherein the controller is further configured to cause the apparatus to:
delay entering a low power mode of the memory system based at least in part on the indication that the garbage collection procedure is ongoing.

11. The apparatus of claim 1, wherein the second vendor command to initiate the garbage collection procedure is associated with a host initiated defragmentation (HID) operation, and wherein the HID operation comprises the garbage collection procedure.

12. The apparatus of claim 1, wherein the controller is further configured to cause the apparatus to:
set, at the memory device, an indication that the garbage collection procedure is being performed based at least in part on initiating the garbage collection procedure.

13. An apparatus, comprising:
a controller associated with a memory device, wherein the controller is configured to cause the apparatus to:
transmit, to a memory system, a first vendor command requesting a status of the memory system, the status indicating a fragmentation parameter associated with addresses storing valid data relative to other addresses of the memory system, wherein the first vendor command comprises a write buffer command to store the status at a first buffer and an indication of an address of the first buffer, and wherein the first vendor command further comprises a read buffer command to read the status at a first buffer and an indication of the address of the first buffer;
receive, from the memory system, the status of the memory system based at least in part on transmitting the first vendor command;
transmit, to the memory system, a second vendor command to initiate a garbage collection procedure based at least in part on the status;
transmit, to the memory system, a third vendor command to identify a status of the garbage collection procedure stored in a second buffer, wherein the status comprises an indication of a portion of the garbage collection procedure that has been completed; and
receive, from the memory system, the status of the garbage collection procedure based at least in part on transmitting the third vendor command.

14. The apparatus of claim 13, wherein transmitting the first vendor command is configured to cause the apparatus to:
transmit, to the memory system, a write command to store the status of the memory system at the first buffer; and
transmit, to the memory system, a read command for the first buffer, wherein transmitting the status of the memory system is further based at least in part on receiving the read command.

15. The apparatus of claim 13, wherein transmitting the second vendor command is configured to cause the apparatus to:
transmit, to the memory system, a write command to store an indication to initiate the garbage collection procedure at a second buffer, wherein initiating the garbage collection procedure is based at least in part on identifying the indication.

16. The apparatus of claim 10, wherein transmitting the third vendor command is configured to cause the apparatus to:
transmit, to the memory system, a write command to store the status of the garbage collection procedure at the second buffer; and
transmit, to the memory system, a read command for the second buffer, wherein receiving the status of the garbage collection procedure is further based at least in part on receiving the read command.

17. The apparatus of claim 13, wherein the controller is further configured to cause the apparatus to:
transmit, to the memory system, a fourth vendor command to interrupt the garbage collection procedure based at least in part on transmitting the first vendor command.

18. The apparatus of claim 17, wherein transmitting the fourth vendor command is configured to cause the apparatus to:
transmit, to the memory system, a write command to store an indication to interrupt the garbage collection procedure at a second buffer, wherein interrupting the garbage collection procedure is based at least in part on identifying the indication.

19. The apparatus of claim 13, wherein the second vendor command to initiate the garbage collection procedure is associated with a host initiated defragmentation (HID) operation, and wherein the HID operation comprises the garbage collection procedure.

20. A non-transitory computer-readable medium storing code, the code comprising instructions executable by a processor to:
receive, from a host system, a first vendor command requesting a status of a memory system, the status indicating a fragmentation parameter associated with addresses storing valid data relative to other addresses of the memory system, wherein the first vendor command comprises a write buffer command to store the status at a first buffer and an indication of an address of the first buffer, and wherein the first vendor command further comprises a read buffer command to read the status at a first buffer and an indication of the address of the first buffer;
transmit, to the host system, the status of the memory system based at least in part on receiving the first vendor command;
receive, from the host system, a second vendor command to initiate a garbage collection procedure based at least in part on transmitting the status;
initiate the garbage collection procedure based at least in part on receiving the second vendor command;
receive, from the host system, a third vendor command to identify a status of the garbage collection procedure stored in a second buffer, wherein the status comprises an indication of a portion of the garbage collection procedure that has been completed; and transmit, to the host system, the status of the garbage collection procedure based at least in part on receiving the third vendor command.

21. The non-transitory computer-readable medium of claim 20, wherein the instructions to receive the first vendor command are executable by the processor to:

receive, from the host system, a write command to store the status of the memory system at the first buffer; and receive, from the host system, a read command for the first buffer, wherein transmitting the status of the memory system is further based at least in part on receiving the read command.

22. The non-transitory computer-readable medium of claim 20, wherein the instructions to receive the second vendor command are executable by the processor to:

receive, from the host system, a write command to store an indication to initiate the garbage collection procedure at a second buffer, wherein initiating the garbage collection procedure is based at least in part on identifying the indication.

* * * * *